United States Patent [19]

Toeppen

[11] Patent Number: 5,410,397
[45] Date of Patent: Apr. 25, 1995

[54] METHOD AND APPARATUS FOR HOLOGRAPHIC WAVEFRONT DIAGNOSTICS

[75] Inventor: John S. Toeppen, Livermore, Calif.

[73] Assignee: The United States of America as represented by the United States Department of Energy, Washington, D.C.

[21] Appl. No.: 18,330

[22] Filed: Feb. 16, 1993

[51] Int. Cl.⁶ .............................................. G11B 7/09
[52] U.S. Cl. ................................ 356/121; 250/231.14
[58] Field of Search ................ 356/2, 10, 15, 11, 356, 356/346, 347, 354, 121, 374; 250/231.14

[56] References Cited

U.S. PATENT DOCUMENTS

| | | | |
|---|---|---|---|
| 3,632,182 | 1/1972 | Sincerbox | 359/10 |
| 3,690,159 | 9/1972 | Kersch et al. | 356/347 |
| 4,832,445 | 5/1989 | Haines et al. | 359/2 |
| 4,998,786 | 3/1991 | Friesem et al. | 359/15 |
| 5,066,129 | 11/1991 | Matsui | 356/356 |
| 5,073,710 | 12/1991 | Takagi et al. | 356/374 |
| 5,098,176 | 3/1992 | Wolf | 359/11 |
| 5,111,445 | 5/1992 | Psaltis et al. | 356/121 |
| 5,165,045 | 11/1992 | Eselun | 356/374 |

OTHER PUBLICATIONS

John S. Toeppen, et al.; A Video Hartmann Wavefront Diagnostic That Incorporates A Monolithic Microlens Array; Lawrence Livermore National Lab., SPIE International Symposium on Optical Applied Science & Engineering, San Diego, Calif. Jul. 1991.
Yvonne A Carts; Microelectronic Methods Push Binary Optics Frontiers; Laser Focus World; Feb. 1992; pp. 87–95.
Chandraekhar Roychoudhuri et al.; Minature And Micro–Optics: Fabrication And System Apps. SPIE, vol. 1544, 1991.
M. E. Motamedi; High Speed Binary Optic Microlens Array In GaAs; Rockwell International Science Center; SPIE, vol. 1544, 1991 pp. 33–44.
Vincent V. Wong et al.; Binary Optic Interconnects: Design, Fabrication And Limits On Implementation; Lincoln Lab, SPIE vol. 1544, 1991, pp. 123–133.
D. Kwo, et al; A Hartmann–Shack Wavefront Sensor Using A Binary Optic Lenslet Array SPIE vol. 1544, 1991, pp. 66–107.
T. Werner, et al.; Microlens Array For Starting Infrared Imager; MIT–Lincoln Lab.; SPIE, vol. 1544 pp. 46–57.
M. E. Motamedi; Silicon Microlens For Enhanced Optical Coupling To Silicon Focal Planes; SPIE, vol. 1544, 1991, pp. 22–32.
Stefano Beretta, et al.; Optimum Design Of Phase Gratings For Diffractive Optical Elements Obtained By Thin Film Deposition; SPIE, vol. 1544, 1991, pp. 2–9.

*Primary Examiner*—Rolf Hille
*Assistant Examiner*—Alexander Oscar Williams
*Attorney, Agent, or Firm*—Miguel A. Valdes; Roger S. Gaither; William R. Moser

[57] ABSTRACT

A wavefront diagnostic apparatus has an optic and a measuring system. The optic forms a holographic image in response to a beam of light striking a hologram formed on a surface of the optic. The measuring system detects the position of the array of holographic images and compares the positions of the array of holographic images to a reference holographic image.

20 Claims, 3 Drawing Sheets

METHOD AND APPARATUS FOR HOLOGRAPHIC WAVEFRONT DIAGNOSTICS

The United States Government has rights in this invention pursuant to Contract No. W-7405-ENG-48 between the United States Department of Energy and the University of California.

BACKGROUND OF THE INVENTION

1. Field of the Invention

The present invention relates to methods and apparatus for laser wavefront diagnostics and, in particular, to the method and apparatus for measurement of the parallelism of the rays of light within a laser beam. Other geometric parameters such as beam pointing and centering, may also be measured using these diffractive optical elements.

2. Description of the Related Art

The quality of a laser beam can be defined by a number of factors. One such factor is the localized slope error of the beam. The localized slope error, which is typically measured utilizing a wavefront diagnostic apparatus, defines the parallelism between different bundles of light rays within a laser beam.

The operation of a wavefront diagnostic apparatus can best be understood by first considering the operation of a pointing diagnostic apparatus. A simple pointing diagnostic apparatus, which measures the incident angle formed between an incoming laser beam and the surface of an object struck by the incoming laser beam, can be formed by placing a viewing screen in back of an opaque object that has a pinhole aperture formed through the surface of the opaque object. When the opaque object is illuminated by the laser beam, the pinhole aperture forms a spot of light on the viewing screen. The position of the spot of light on the screen is related to the incident angle of the incoming beam. If a reference beam also illuminated the opaque object, the difference in position between the two spots would be related to the angular difference between the incoming beams.

The measurement of the parallelism of rays within a beam may be determined using an array of pointing diagnostics. A "Hartmann diagnostic apparatus" is a wavefront diagnostic device consisting of an array of holes in a perforated plate. As with the pointing diagnostic apparatus, by comparing the position of each spot of the array of spots produced by a collimated beam of light to the position of a corresponding spot produced by the test beam of light, where both the collimated beam and the test beam emanate from the same location, the incident angle of each bundle of light rays can be determined.

An enhanced version of the Hartmann diagnostic apparatus, known as the Hartmann-Shack diagnostic apparatus, employs an array of converging lenslets in place of the array of pinhole apertures. The array of converging lenslets captures the light that strikes each lenslet and focuses the light onto the viewing screen as an array of focused spots.

The array of focused spots has the advantage of simplifying the task of comparing the relative positions of each image because it is easier to determine the positional variation of a focused spot than it is to determine the positional variation of fuzzy blobs of light.

In addition to the array of converging lenslets, the Hartmann-Shack diagnostic apparatus may employ the detection array of a video camera as the viewing screen. The utilization of a video detection system provides a means for integrating computerized positional processing into the Hartmann-Shack diagnostic apparatus, thereby enhancing the speed and accuracy of a parallelism measurement.

Although the Hartmann-Shack diagnostic apparatus has several advantages, there are several disadvantages as well. First, by utilizing the detection array of a video camera, which is typically 6.6 by 8.8 millimeters in size, the diameter of a laser beam, which can range in size from one millimeter to a meter in diameter, must typically be altered to match the diameter of the detector. The process of increasing or reducing the diameter of a laser beam requires the precise positioning of a number of mirrors and/or lenses, each of which introduce aberrations into the resulting laser beam and increase the cost and complexity of the parallelism measurement.

Second, since the array of converging lenslets captures almost all of the light which strikes the lenslets, a dedicated laser beam must be used to make the parallelism measurements. This requires that a primary laser beam be split to produce the dedicated laser beam, further increasing the cost and complexity of the parallelism measurement.

Third, a laser beam is frequently comprised of multiple colors or frequencies. When multiple frequencies are present, it is typically desirable to test the parallelism of each frequency. In the Hartmann-Shack diagnostic apparatus, multiple color testing requires the repeated utilization of cumbersome color filters to remove the unwanted frequencies.

Thus, there is a need for a wavefront diagnostic apparatus which does not require beam diameter sizing, the separate formation of a dedicated test beam, and the use of color filters.

SUMMARY OF THE INVENTION

In accordance with the present invention, a wavefront diagnostic apparatus and method for determining the parallelism of the rays of light within a beam of light are disclosed. The wavefront diagnostic apparatus includes optical means for forming a holographic image in response to an incident beam of light. The optical means may include, for example, an optic having either an array of holographic images where each image corresponds to a different bundle of light rays within the incident beam of light or a single holographic image where each portion of the single holographic image corresponds to a different ray within the incident beam of light. The wavefront diagnostic apparatus further includes measuring means for detecting the holographic image and for comparing the holographic image to a reference holographic image or real object. The measuring means may include, for example, a detector, which detects the holographic image and generates a digital representation in response, and a comparator, which determines a variation between the holographic image and the reference holographic image. In the present invention, the parallelism of the rays of light within the incident beam of light is determined by a variation between the holographic image and the reference holographic image.

The invention is also directed to a method for measuring the parallelism of a beam of light. The method includes the steps of providing a collimated beam of light, providing a test beam of light, and providing an optic having an array of transmission holograms formed on a surface of the optic. Next, the optic is illuminated with the collimated beam of light so that the optic forms an array of regularly spaced focal spots as projected real holographic images. The position of the spots produced by the collimated beam is captured and stored. This may be accomplished, for example, using film or an electronic system.

The optic is then illuminated with the test beam to produce another array of spots. The differences between the spot patterns from the two beams is then determined and the wavefront error determined.

A better understanding of the features and advantages of the present invention will be obtained by reference to the following detailed description and accompanying drawings which set forth an illustrative embodiment in which the principles of the invention are utilized.

DETAILED DESCRIPTION OF THE INVENTION

Figure 1:
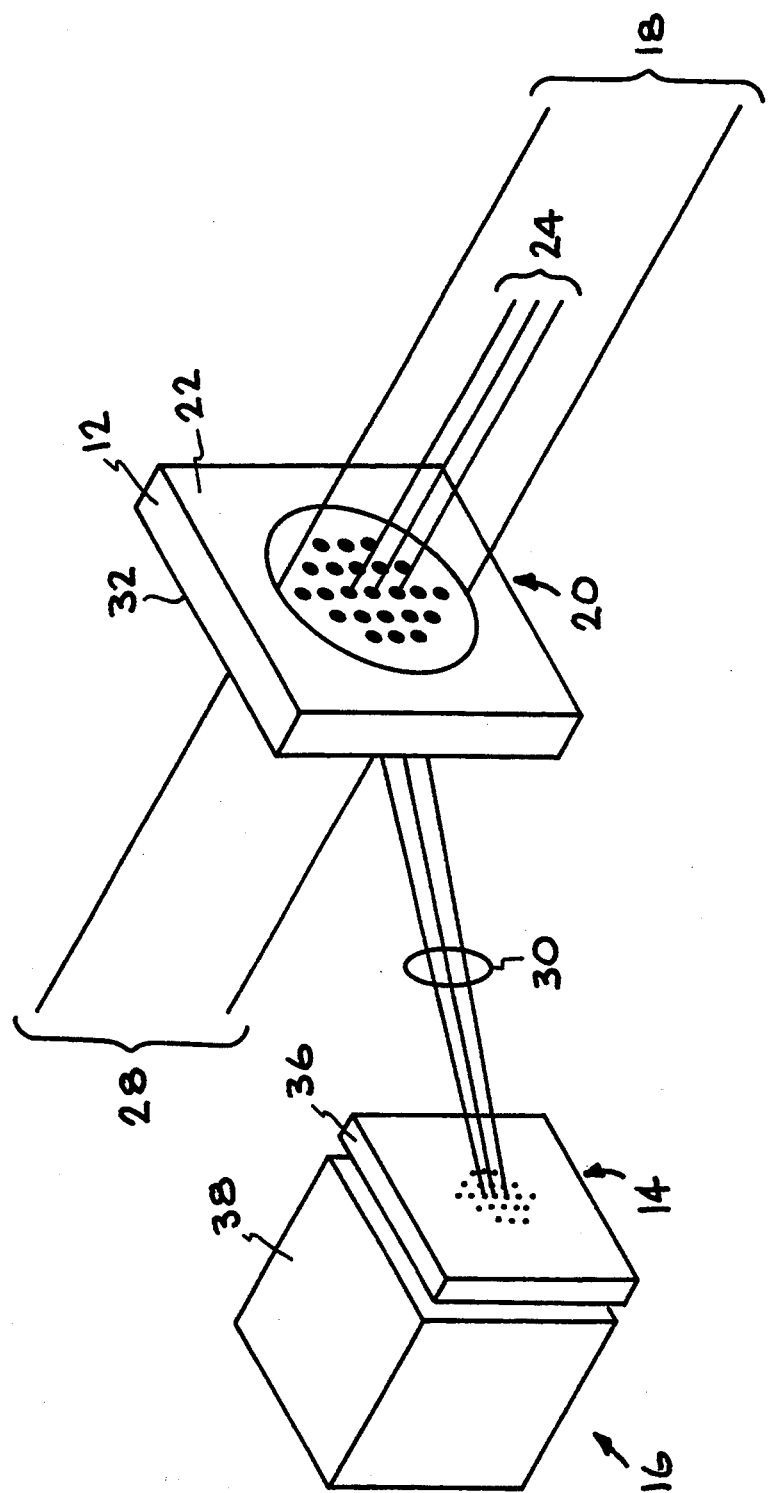
FIG. 1 is a top left-side perspective view illustrating a first embodiment of the wavefront diagnostic of the present invention.

FIG. 1 shows a first embodiment of a wavefront diagnostic apparatus 10 for measuring a parallelism of a beam of light in accordance with the present invention. In the FIG. 1 embodiment, the wavefront diagnostic apparatus 10 includes an optic 12 that forms an array of holographic images 14 and a measuring system 16 that detects each holographic image 14 and compares the position of each detected holographic image 14 to a reference value. The optic 12 forms the array of holographic images 14 in response to a test beam of light 18 striking a corresponding array of transmission holograms 20 formed on or within the volume surface 22 of the optic 12.

In accordance with the present invention, the array of transmission holograms 20 are formed on the optic 12 so that each resulting holographic image 14 corresponds to a different bundle of light rays 24 within the test beam of light 18. As described in greater detail below, the parallelism measurement is derived by comparing each holographic image 14 formed by the test beam of light 18 to a corresponding image (not shown in FIG. 1) formed by a collimated beam of light (not shown in FIG. 1). The degree of variation in the position of each holographic image 14 in relation to its corresponding holographic image formed from the collimated beam indicates the degree of non-parallelism of each corresponding bundle of light rays 24.

The test beam of light 18 may be acquired in a number of different ways. For example, a high power beam may be directly sampled utilizing an optic 12 which diverts the necessary image array into the measuring system 16. It is also possible to provide a sample of the high power beam using a beam-splitter of a reflective or diffractive nature. A reflective splitter may be a antireflection coated window that provides a fraction of a percent of the transmitted beam for diagnostic purposes. A diffractive optical element may also be used to generate the beam used to feed a small portion of the main beam into a diffractive diagnostic device.

Since the parallelism measurement is based on comparing the position and distortion of each holographic image 14 to its corresponding image formed from the collimated beam, the specific image produced by each hologram 20 of the array is immaterial. As shown in FIG. 1, in the preferred embodiment of the present invention, the image formed by each hologram 20 is the image of a spot.

Figure 2:
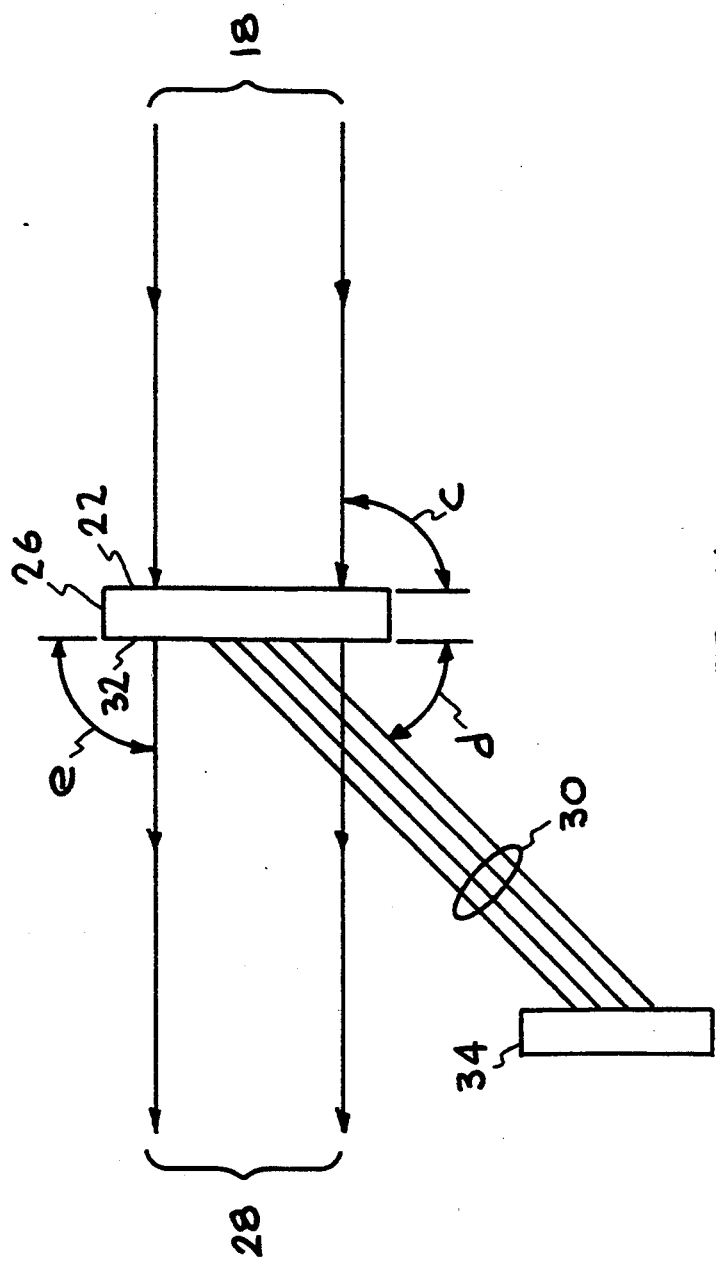
FIG. 2 is a plan view illustrating a transmissive optic in the FIG. 1 embodiment.

FIG. 2 shows a plan view of a transmissive optic 26 in the FIG. 1 embodiment. As shown in FIG. 2, the array of holograms 20 (see FIG. 1) formed on the optic 26 divides the test beam of light 18, which strikes the front side 22 of the optic 26 at an incoming angle of incidence C, into a transmitted beam 28 and an array of diffracted beams 30 which diverge from the undiffracted beam of light 28 exits at predetermined angle. The array of diffracted beams of light 30, is formed by the portion of the test beam of light 18 which is diffracted by the array of transmission holograms 20. The undiffracted beam of light 28, which passes through the optic 26 without being diffracted by the array of transmission holograms 20 (see FIG. 1), is projected out the back side 32 at an outgoing angle E which is substantially equivalent to the incoming angle of incidence C.

Alternately, the array of holograms 20 (see FIG. 1) can be formed so that the array of diffracted beams of light 30 is substantially coaxial with the undiffracted beam of light 28. In the preferred embodiment of the present invention, the array of diffracted beams of light 30 diverges from the undiffracted beam of light 28.

The array of holograms 20 may be used in transmission or reflection. If the holograms 20 were etched or pressed into an optic, such as a window, either the transmitted beam or the back reflected light could be used as a diagnostic. The microgrooves which form each hologram 20 could also be buried beneath the surface of a multilayer coated mirror provided that some of the diffractive topography still appeared on or near the surface. The relative brightness of the reconstructed images would be related to the diffraction efficiency of the holograms 20 and their active areas. A very low efficiency is desirable for diagnostics because detectors need microwatts and beams are often kilowatts.

The intensity of the undiffracted beam of light 28 in the FIG. 2 embodiment is partially determined by the diffraction efficiency of the array of holograms 20. The diffraction efficiency of a hologram is the percentage of the total light striking a hologram which is utilized in forming a holographic image. By varying the diffraction efficiency of the array of holograms, the optic can be utilized both in a high power setting and a low power setting.

In a high power setting, an array of low diffraction efficiency holograms, which only diffract a small percentage of an incident beam of light, can be utilized so that the intensity of the undiffracted beam of light 28 is substantially equivalent to the incident beam of light. Alternately, in a low power setting, an array of high diffraction efficiency holograms, which can diffract substantially all of an incident beam of light, can be utilized where only a weak incident beam is available.

As shown in FIG. 2, when the array of diffracted beams of light 30 diverge from the undiffracted beam of light 28, the array of diffracted beams of light 30 form the array of holographic images 14 (see FIG. 1) at a location 34 which is outside of the undiffracted beam of light 28. By forming the array of holograms 20 (see FIG. 1) on a transmissive optic 26 so that the array of diffracted beams of light 30 diverge from the undiffracted beam of light 28, several advantages can be realized.

First the need for a separate beam splitter to provide light for diagnostics in high power applications is eliminated. The holographic features may be imparted to the surface of an optic already present in the system. Also, the amount of light diffracted into the diagnostic could be a ten thousandth of the transmitted beam 28, rather than the tenths of a percent which is typical of beam splitters. This allows the useful power of the beam to pass without significant loss in power.

Second, the need for multiple color filters, as often required by the Hartmann-Shack diagnostic apparatus, can also be eliminated. Transmission holograms which produce an array of diffracted beams of light 30 at an angle of incidence which is different from an incident beam of light produce a separate holographic image for each color contained within the test beam of light 18 at a different location for each wavelength in the same image plane. Thus, when a diverging, low-diffraction efficiency hologram is placed within the beam path of the test beam of light 18, the parallelism of each color contained within the test beam 18 can be simultaneously measured.

Third, the array of holograms 20 (see FIG. 1) can be formed on an existing transmissive optic. By forming the array of holograms 20 on an existing transmissive optic, additional beam aberrations, which are introduced by every optical element in an optical system, are eliminated.

Referring again to FIG. 1, the array of transmission holograms 20 can be formed so that the positional relationship between each holographic image 14 is either equivalent to or different from the positional relationship between each hologram 20. For example, a uniform array of holograms, which has a 0.1 centimeter spacing between each adjacent hologram, can be constructed so that the array of resulting holographic images also has a 0.1 centimeter spacing between each adjacent image. Similarly, a separate uniform array of holograms, which also has a 0.1 centimeter spacing between each adjacent hologram, can be constructed so that the array of resulting holographic images has, for example, a 0.05 centimeter, spacing between each adjacent image.

By reducing the relative distance between each holographic image 14, the need to increase or reduce the size of the diameter of the test beam of light 18, as required by the Hartmann-Shack diagnostic apparatus, can be eliminated. The diameter sizing requirements can be eliminated because the reduction of the separation distance between each holographic image 14 has the effect of reducing the size of the diameter of the test beam of light 18.

Referring again to FIG. 1, the measuring system 16, which detects each holographic image 14 and compares the position of each holographic image 14 to a reference value, may include an electronic detector 36 and a comparator 38. The electronic detector 36 detects the array of holographic images 14 and generates a digital representation which describes the array of holographic images 14. In the preferred embodiment of the present invention, the CCD (charged coupled device) array of a standard high-resolution video system, such as model 4810 manufactured by Cohu Electronics, is utilized as the detector 36.

The comparator 38 determines a position and a distortion for each holographic image 14 in the array from the digital representation of the array and compares the position and distortion of each of the holographic images 14 formed by different beams of light. In the preferred embodiment of the present invention, the position of each image 14 is determined by determining a centroid of the image 14. A general purpose computer can be utilized to determine the centroids of each image 14 in the array utilizing well-known computer programs.

In operation, the parallelism measurement is taken by first directing a collimated beam of light (not shown in FIG. 1) at the optic 12. The collimated beam of light strikes the optic 12 at an angle of incidence which is identical to a reference beam of light (not shown in FIG. 1). As described below, a reference beam of light is a beam of light utilized in the traditional formation of holograms which can approach the optic 12 from either side 22 or 32.

When the collimated beam of light which strikes the optic 12 from a direction which is opposite to the direction of the reference beam used to make the hologram, the array of holograms 20 on the optic 12 form a corresponding array of real, symmetrically arranged, holographic images on the surface of the electronic detector 36. As stated above, the electronic detector 36 detects the array of symmetric holographic images and generates a digital representation of the array. The comparator 38 then determines the position of each individual spot or individual reconstructed image. The comparator 38 then calculates the centroid of each spot or image on the detector 36 and stores this data.

Next, the test beam of light 18 is positioned in place of the collimated beam of light and directed at the optic 12 from the same direction. Similarly, the test beam of light 18 forms an array of real, symmetrically-arranged holographic images 14 on the surface of the electronic detector 36. The electronic detector 36 again detects the array of test holographic images 14 and generates a digital representation of the array 14. The comparator 38 again determines a position for each test image 14. The position of each holographic test image 14 in the array is then compared to the stored data of the ideal centroid locations. A parallelism measurement is then derived from a variation between the two images. It is important to note that it is the distortion of the symmetry of the spots which is indicative of wavefront error, not their absolute position on the video detector.

One method of utilizing an electronic detector and a computer is described in *Miniature and Micro Optics: Fabrication and System Applications,* SPIE Proceedings, Vol. 1544, which is hereby incorporated by reference.

A simple visual comparison can be made of the images 14 by projecting the images 14 onto a viewing screen covered with an outline mask. When the array of test holographic images is then formed, each test image 14 can be visually compared to the mask. A simple outline mask can be formed by utilizing a sheet of photographic film as the viewing screen and exposing the film while it is positioned in the image plane. The image formed by a collimated beam is stopped while the image formed by a noncollimated beam would be offset and would therefore pass through the negative.

Figure 3:
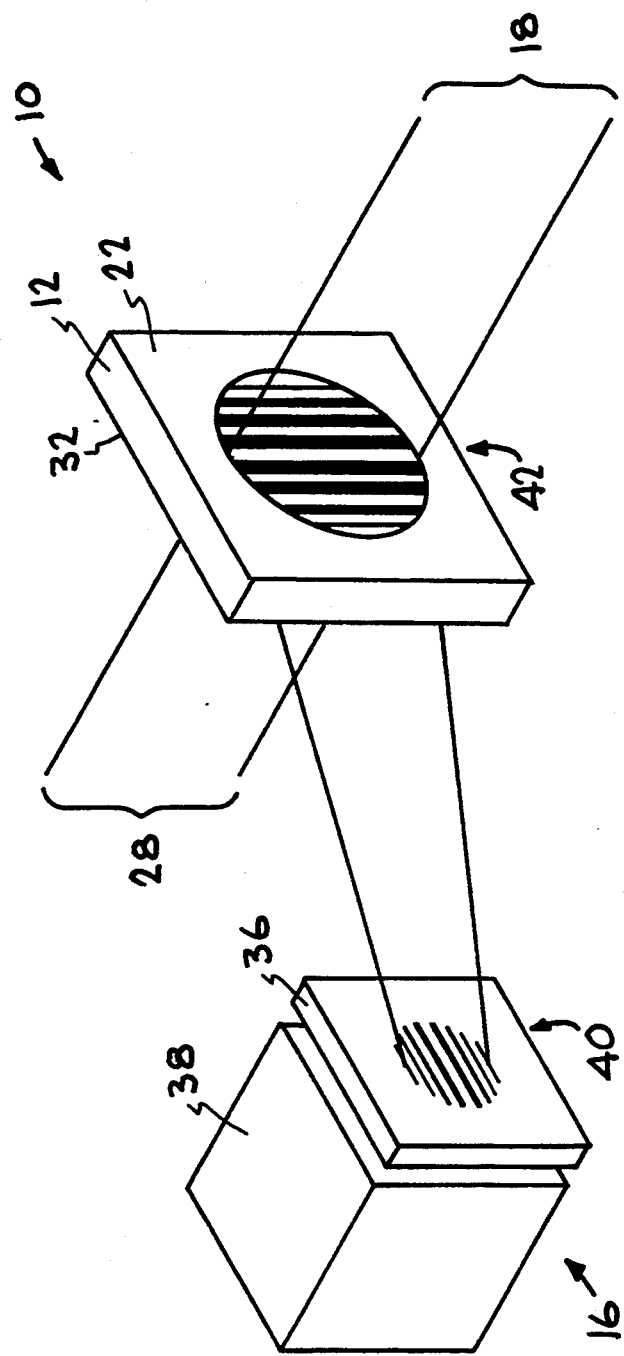
FIG. 3 is a top left-side perspective view illustrating a second embodiment of the wavefront diagnostic of the present invention.

FIG. 3 shows a second embodiment of the wavefront diagnostic apparatus 10 of the present invention. In the FIG. 3 embodiment, the optic 12 forms a wavefront holographic image 40 in response to the test beam of light 18 striking a wavefront hologram 42 formed on the surface 22 of the optic 12.

In the present invention, the wavefront hologram 42 is formed on the optic 12 so that each portion of a single resulting holographic image corresponds to a different ray within an incident beam of light (not shown in FIG. 3). Since each portion of the resulting image 40 is formed by different rays within the incident beam of light, a parallelism measurement can also be derived from a comparison of the resulting images 40 produced by a collimated beam of light (not shown in FIG. 3) and the test beam of light 18.

As with the array of holographic images 20 (see FIG. 1) since the parallelism measurement is based on an image comparison, the wavefront hologram 42 can also be formed from any image. In the present invention, an image of a ruling, such as a checkerboard pattern or a crossed set of rhonchi rulings, are preferred because of the relative ease in discerning distortions in the image 40. This is particularly true if the original ruling used to make the hologram is positioned to block most of the rays projected by the hologram, thereby allowing light to pass where the ruling and the image of the ruling are different.

All methods of determining wavefront error utilizing the projected real image compare the distortion of the image to some fixed reference. This fixed reference can be a stored film image, the original ruling or lenslet used in making the hologram, a electronically stored idealized image, or stored information from a reference beam. Similarly, when the collimated beam of light is directed at the optic 12 from a direction which is the same as the reference beam and the object beam, a virtual holographic image is produced. It is widely known that gratings and holograms produce a number of images simultaneously. When a hologram is illuminated it will produce images which proceed in the general direction of the original beam but are diffracted to either or both sides of it. One of the images produced is a faithful image of the object while the one on the other side of the beam, mirrors the first and is known as a conjugate of the first. Additionally, a second order of diffraction creates a fainter image of the object diffracted from the main beam at a larger angle and this too may have a conjugate image. Similarly, third, fourth, fifth, and other orders may also be created accompanied by their conjugate beams.

It is also known that virtual images, conjugate virtual images, and multiple orders are created which may be reimaged to provide a similar diagnostic functions. Reflections from the surface of the hologram will be formed which will produce both real and virtual images as well as images of different orders.

Any of these images might be used to provide these diagnostic functions and are also intended to be covered within the scope of this patent. It is also worthwhile to note that any of these images may be suppressed or enhanced by those familiar with diffractive elements and holographic principles.

In the preferred embodiment of the present invention, a real holographic image is utilized. Such projected real images are generally recognized as those which would appear to be in sharp focus on a card held in the position of the projected image.

The use of the reference (collimated beam) is desireable but not always necessary. The reference beam shares a common path with the test beam through the diagnostic apparatus. Any common path errors will appear in both beams allowing these to be subtracted out of the data. Some applications may not require a reference beam, but it is necessary in high precision applications.

More than one holographic optical element may be used in series to produce the desired effects. Arrangements of multiple holographic elements may be used in series and or in combination with refractive elements to optimize a diagnostic device. This may be done for a variety of reasons. Some examples of these reasons include heightened sensitivity, aberration correction, the inclusion of additional diagnostic functions, and color separation combined with recombination.

Heightened sensitivity may be achieved by using one or more holographic elements in series or in combination with refractive optical elements. A diffractive telescope is a good example of this kind of arrangement. A pair of Fraunhofer zone plates may be produced of two different focal lengths and separated by the approximate sum of those focal lengths. If a laser beam were to be brought to focus using the longer focal length element the second element may be used to project the focused image to a near or far field detector. The resultant output would provide a smaller diameter beam as well as an amplification of the angle of incidence of the beam entering the first element. Alternately, the second optical element could be a simple lens of high or low dispersion dependent on the desired system objectives.

When a single straight line grating is used to diffract a portion of a beam the diffracted beam will have a different cross section than the original beam. If the original beam was round in section the diffracted beam will be an ellipse. By intercepting the diffracted beam with another grating of the same frequency, one of the diffracted orders from the ellipsoidal beam may be made round again. A similar corrective relationship would exist is a matched pair of zone plates were used in combination.

The first holographic element in a system could be used entirely for the purpose of beam splitting and sizing. The second holographic element could have similar object and reference beam angles but could contain a hologram of a microlens element. The advantage of this relationship is that the simple low frequency ruling used to sample the high power beam need not contain all of the fine line structure required for the "lenslet hologram". This would make it easier to produce the larger high damage threshold "beam splitting and sizing" hologram and allow the second element to have finer structure over a smaller lower damage threshold element.

A more complex arrangement may be utilized to disperse, size, and recombine 'multiple wavelengths onto a single detector. The advantage of such a dispersion allows the individual wavelengths to be individually blocked or allowed to pass prior to recombination. This allows sequential viewing of different wavelengths utilizing the same detector. The advantage of this arrangement is greatest in a laser system requiring frequent adjustment to assure coaxial alignment of laser beams of different wavelengths.

The function of a wavefront diagnostic is to measure the parallism and other geometric and wavelength parameters of beams of light. While this disclosure specifically states that the wavefront is what is being measured, it is commonly known the such measurements are often used to characterize optical quality surfaces and optical elements as well. This is accomplished by evaluating the beam of light which is reflected from or transmitted through the object being tested. The measurement of the optical properties of a beam may therefore be used to infer the properties of an object by the measurement of beam perturbations.

The array of focused spots produced by the holographic wavefront diagnostic, when taken as a group, have a position which is indicative of the pointing of the entire beam. This information is referred to as "tilt" and does not indicate wavefront. The overall beam pointing must be stabilized, or subtracted out, to provide good wavefront data. This is typically achieved by stabilizing the beam using a pointing sensor coupled with a high speed pointing control mirror.

Traditional methods use refractive optics to create a focused spot whose position is monitored to determine beam pointing. This information is processed and used to adjust a mirror to stabilize beam pointing.

The present invention allows for the acquisition of "tilt" information from the single detector used to acquire wavefront data. When the position of the entire array of images moves, this information may be used as pointing data. The spot to spot distance indicates the differences in pointing within the beam while the shift in position of the array of images shows overall beam movement. This whole beam movement must be subtracted from the data set to generate good wavefront data.

A practical operating system often requires that tilt is corrected for at a speed of a few hundred or thousand cycles per second. When such high data rates are required, a video based detector is often replaced by a lateral effect diode that produces voltages that are proportional to the position of spots of light on the face of the detector. The conjugate and second order images generated by the holographic may be used to detect overall beam pointing data.

Alternately, the diagnostic hologrammay be made to include the image of a single point source along with the image of the lenslet array. The image of this point source would need to be recorded evenly over the entire face of the wavefront diagnostic to evenly represent the pointing of the entire beam being measured. Such an image would provide a smaller spot allowing for the use of a smaller and faster detector. This approach allows a stabilized or "tilt removed" beam to be provided for the wavefront sensor and is superior to the analytic removal of tilt data.

The sensitivity of the parallelism measurement is dependent upon the separation distance utilized during the formation of either the array of holograms 20 (FIG. 1) or the wavefront hologram 42 (FIG. 3). Generally speaking, one might consider the hologram as a pivot point and the distance between the hologram and the projected image as the length of a lever arm. This means that the greatest positional displacement for a given angular change in the test beam 18 is at the greatest separation between the hologram and the image.

A practical limit to the separation between the hologram and the image is imposed by the diffractive nature of light. If the distance is too great the sharpness of the projected image degrades as a function of the diffraction limited spot size determined by the effective F# of the hologram. This is dependant on the effective diameter of the holographic feature projecting the image, the focal length, and the wavelength(s) used.

The holographic image can exist in a variety of different materials. One of the easiest materials is silver halide in gelatin with silver halide, however the finished image is largely opaque which renders the transmitted beam virtually useless. Dichromated gelatins scatter the transmitted beam 28 and project a fuzzy image. Both of these mediums can be used with a low power "sample" beam produced using a conventional beam splitter. Both of these methods, however, are not suitable for direct high power applications.

A "phase hologram" consists of fine hills and valleys in a transparent medium. A "phase" image can have a high damage threshold, be produced with a high or low efficiency, and have a good throughput beam quality. A silica substrate may be etched using resist and etch methods known in the graphic art and microprocessor industries.

Many different holographic mediums exist. The selection of the medium is dependant on the application and the technology at hand. Beam diagnostic devices might well use any of these approaches. The idealized embodiment described here utilizes an etched fused silica substrate. This design allows most of the light to pass through the hologram without being diffracted (this is known as the zero order). A fraction of a percent of the throughput beam would be diffracted into the diagnostic "leg".

In the present invention, both the array of holograms 20 (FIG. 1) and the wavefront hologram 42 (FIG. 3) are formed on the optic 12 using conventional holographic techniques. The array of holograms 20 (FIG. 1) and the wavefront hologram 42 (FIG. 3) can be formed on lenses, mirrors, and optical flats using well-known photolithographic or electron beam etching techniques and on holographic film using conventional holographic photographic techniques. When holographic film is utilized, film which provides a resolution of approximately 2,000 line pairs per millimeter, such as Model 10E75 or 8E75, manufactured by AGFA-Gaevert, or Model 649F, manufactured by Kodak is recommended.

The diffractive optical element used for wavefront diagnostics may be produced by making a hologram of a lenslet array. This is accomplished by exposing a holographic material to an even illumination from a well collimated reference beam while simultaneously exposing it to a fan of rays from a point source situated behind the lenslet array. The interference pattern generated is recorded by the photosensitive medium and subsequently developed.

If the processed hologram is returned to the position where it was exposed and the direction of the collimated reference beam is reversed, light will be diffracted by the hologram in the form of a converging fan of rays which will pass through the lenslets and focus to form an image of the original point source. If the reversed reference beam is not an exact reversal replica of the original reference beam, the diffracted rays will not exactly reverse their original path. Only a precisely reversed beam will produce a perfect projected image of the lenslets, this being the essence of this diagnostic device.

The evaluation of the distortion of the projected real image reveals any variation in the angle of illumination. Any non-parallelism of rays within the beam will create positional errors in the array of focused spots. The localized slope or pointing errors within the beam may be precisely determined by evaluating the positions of the spots.

The method of producing the hologram is secondary to the principles described herein. Computers may be used to design diffractive elements which accomplish this function. The projected image may be of a subject other than a regular array of lenslets or spots.

It should be understood that various alternatives to the structures described herein may be employed in practicing the present invention. It is intended that the following claims define the invention and that the structure within the scope of these claims and their equivalents be covered thereby.

What is claimed is:

1. A wavefront diagnostic apparatus for determining the parallelism of rays of light within a beam of light, the wavefront diagnostic comprising:
   optical means for forming a projected holographic image in response to an incident beam of light; and
   measuring means for detecting the projected holographic image and for comparing the projected holographic image to a reference holographic image,
   wherein the parallelism of the rays of light within the incident beam of light is determined by the degree of variation between the projected holographic image and the reference holographic image.

2. The wavefront diagnostic apparatus of claim 1 wherein the projected holographic image comprises an array of projected holographic images.

3. The wavefront diagnostic apparatus of claim 2 wherein the optical means comprises an optic having an array of holograms formed on a surface of the optic, the array of holograms forming the array of projected holographic images such that each projected holographic image corresponds to a different bundle of light rays within the incident beam of light.

4. The wavefront diagnostic apparatus of claim 3 wherein the optic transmits both an array of diffracted beams of light and an undiffracted beam of light, the array of diffracted beams of light formed from a diffracted portion of the incident beam of light, the undiffracted beam of light formed from an undiffracted portion of the incident beam of light.

5. The wavefront diagnostic apparatus of claim 4 wherein the pattern of diffracted beams of light diverges from the undiffracted beam of light.

6. The wavefront diagnostic apparatus of claim 5 wherein a positional relationship between each holographic image is smaller than the positional relationship between each hologram.

7. The wavefront diagnostic apparatus of claim 6 wherein each hologram forms an image of a spot.

8. The wavefront diagnostic apparatus of claim 3, wherein the optic comprises a lens.

9. The wavefront diagnostic apparatus of claim 1, wherein the optical means comprises an optic having a single hologram formed on a surface of the optic, the single hologram forming the projected holographic image so that each portion of the projected holographic image corresponds to a different ray within the incident beam of light.

10. The wavefront diagnostic apparatus of claim 1, wherein the projected holographic image includes an image of a rhonchi ruling, a checkerboard pattern, or another regular array.

11. The wavefront diagnostic apparatus of claim 3, wherein the optic comprises an optical flat.

12. The wavefront diagnostic apparatus of claim 3, wherein the optic comprises a mirror.

13. The wavefront diagnostic apparatus of claim 3, wherein the optic comprises a holographic film.

14. A method for measuring the parallelism of a beam of light, the method comprising the steps of:
   providing a collimated beam of light;
   providing a test beam of light;
   providing an optic having an array of transmission holograms formed on a surface of the optic;
   illuminating the optic with the collimated beam of light, the optic forming an array of regularly spaced focal spots made by the collimated beam as projected holographic images;
   detecting a position of each spot of the array of spots made by the collimated beam;
   storing the position of said each spot;
   illuminating the optic with the test beam of light, the optic forming an array of test regularly spaced focal spots as projected holographic images, each of said test regularly spaced focal spots corresponding to one of the array of spots made by the collimated beam;
   detecting position of each of the test regularly spaced focal spots; and
   comparing the position of said each of the test regularly spaced focal spots to its corresponding one of the array of spots made by the collimated beam.

15. A wavefront diagnostic apparatus for determining the parallelism of rays of light within a beam of light, the wavefront diagnostic comprising:
   optical means for forming a projected holographic image in response to an incident beam of light; and
   measuring means for detecting the projected holographic image and for comparing the projected holographic image to a real object,
   wherein the parallelism of the rays of light within the incident beam of light is determined by the degree of variation between the projected holographic image and the real object.

16. The wavefront diagnostic apparatus of claim 1 wherein the optical means comprises an optic having a single hologram formed within a volume of the optic, the single hologram forming the holographic image so that each portion of the single holographic image corresponds to a different ray within the incident beam of light.

17. The wavefront diagnostic apparatus of claim 1 wherein the optical means comprises a plurality of aligned optics, each of said plurality of aligned optics having a hologram formed on a surface thereof.

18. The wavefront diagnostic apparatus of claim 17 wherein the optical means further comprises refractive elements connected in series or combination with the plurality of aligned optics.

19. The wavefront diagnostic apparatus of claim 18 wherein a first optic of the plurality of optics is utilized for beam splitting and sizing.

20. The wavefront diagnostic apparatus of claim 2 wherein the measuring means further comprises tilt means for periodically detecting a position of the entire array of projected holographic images and for comparing a current position to a previous position so that beam pointing and beam movement can be detected.

* * * * *